UNITED STATES PATENT OFFICE.

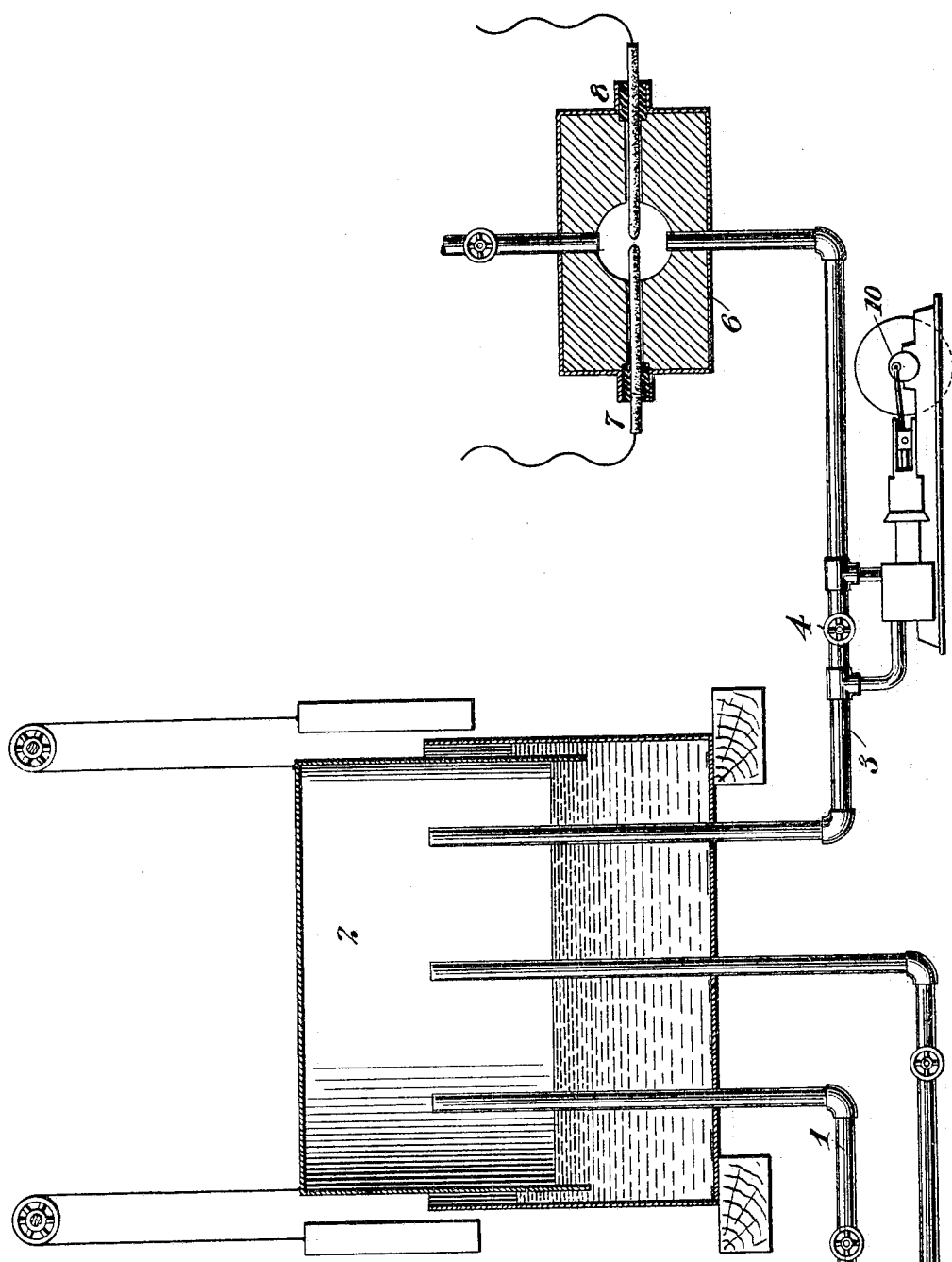

ALEXANDER M. GOW, OF ALLEGHENY, PENNSYLVANIA, ASSIGNOR TO GEORGE WESTINGHOUSE, OF PITTSBURG, PENNSYLVANIA.

PROCESS OF FORMING NITROGEN COMPOUNDS.

No. 801,782.     Specification of Letters Patent.     Patented Oct. 10, 1905.

Application filed December 9, 1902. Serial No. 134,490.

*To all whom it may concern:*

Be it known that I, ALEXANDER M. GOW, a citizen of the United States, and a resident of Allegheny, in the county of Allegheny and State of Pennsylvania, have invented certain new and useful Improvements in Processes of Forming Nitrogen Compounds, of which the following is a specification.

My invention relates to a process of fixing nitrogen as cyanid of ammonia or as cyanogen, hydrocyanic acid, ammonia, or a mixture of the same.

It has heretofore been proposed to subject a current of air to a great heat in the presence of carbon for the purpose of obtaining cyanids or else ammonia, (if hydrogen is added.) Generally speaking, these processes have derived their carbon either from the heating source, as the coke, or the carbon of the arc, or, if gaseous, only from the carbon monoxids. Such processes have been found inefficient, presumably, also, because the resulting temperatures, while high enough to start the reaction, were so excessively high as to result in an ultimate decomposition of a great part of the compounds formed.

My invention aims to utilize as carbon source a hydrocarbon compound and a convenient device adapted to secure a temperature sufficiently high to result in the fixation, but not high enough to be accompanied by any material destruction.

In the drawing I have illustrated, partially in diagram, an apparatus for carrying out my invention.

Referring to the drawing, 1 represents a suitable source of a hydrogen-carbon compound—such, for instance, as a natural gas the composition of which is about ninety-five per cent. of methan, ($CH_4$.)

2 represents a holder in which the required quantity of the gas may be mingled with the necessary proportion of nitrogen or air. From the holder 2 the mixture is conducted by a pipe 3, controlled by a suitable valve 4, to a heating device 6, which in this instance is shown as consisting of a chamber within which an electric arc is formed by means of carbon electrodes 7 and 8, which are controlled outside, so as to give the right temperature. The particular construction of this chamber is not material, provided the gases may be subjected to the proper action.

The product which is produced in the heating-chamber contains a large percentage of cyanid of ammonia or its components—hydrocyanic acid and ammonia. There will be present some undecomposed gases, steam, and free nitrogen; but by properly adjusting the apparatus the proportions of hydrocyanic acid and ammonia may be made relatively large.

In practice I have found that a mixture of half natural gas and half air upon being passed once through the heating-chamber would give a recovery based on the carbon contents of the cyanids formed equivalent to five per cent. of the carbon originally contained in the mixture. Again, from one liter of natural gas and a mixture of one liter of air I have recovered .065 grammes $C_2N_2$, which would be equivalent to .164 grammes KCN. In another experiment from the same mixture I have recovered .0578 grammes $C_2N_2$, equal to .145 grammes KCN.

The most efficient working of the apparatus has been found to be when the arc used to obtain a suitable temperature was sputtering violently while the reaction goes on. When the arc remained quiet and steady between the electrodes, the desired production of nitrogen compound was not obtained, but carbonic acid was formed, as mentioned above.

Any convenient means may be employed for obtaining a suitable pressure on the part of the gases in the reaction-chamber—as, for instance, by regulating the pressure of the gas-holder. In some cases it may be desired to have it greater and sometimes less than atmospheric pressure, according to the results desired to be obtained. If a high pressure is desired, a pump 10 may be employed for that purpose.

When methan ($CH_4$) is subjected to the action of an electric spark, acetylene ($C_2H_2$) is formed. Furthermore, when methan ($CH_4$) is burned with an insufficient supply of oxygen there is the formation of a small amount of acetylene, ($C_2H_2$.) A mixture of acetylene and nitrogen when submitted to the action of an electric current will result in the production of compounds of nitrogen with carbon and hydrogen.

From the foregoing it will be seen that in the operation of my process for the production of compounds of nitrogen from a mixture of air and natural gas there are several chemical reactions that occur simultaneously, but which have heretofore only been produced separately—that is to say, the first effect produced by the action of the electric current upon the mixture of gases would be the breaking up of the methan into carbon and hydrogen, these elements being liberated in their nascent state. The oxygen present immediately combines with a portion of the hydrogen to form water-vapor. This is an exothermic reaction and liberates heat. It is well known that the formation of acetylene ($C_2H_2$) is endothermic. Acetylene is also formed at the same time in my process; but, as stated before, a mixture of acetylene and nitrogen subjected to the action of an electric current will cause the fixation of the nitrogen in a chemical compound. Consequently the acetylene formed by the reaction, as described above, reacts with the nitrogen present, resulting in the formation of the desired nitrogen compound. The process is accordingly a continuous one, these variations and reactions occuring simultaneously and not as the result of separate acts or processes. The reactions involved are as follows:

$$2CH_4 + \text{heat} = 2C + 4H_2$$

$$2C + 4H_2 + O_2 = 2C + 2H_4 + 2H_2O$$

$$2C + 2H_2 + \text{electric action} = C_2H_2 + H_2$$

$$C_2H_2 + 2N + \text{electric action} = 2HCN$$

It is plain that the reactions as written in the above formula do not occur exactly in the order and quantitatively as specified. They occur simultaneously. Furthermore, it is certain that the nitrogen enters into combination with hydrogen in other forms than as hydrocyanic acid, (HCN,) for I have obtained ammonia, ($NH_3$,) which in all probability in the presence of cyanogen would exist as ammonium cyanid.

I claim as my invention—

1. The method of producing hydrocyanic acid (HCN), which consists in subjecting a mixture of methan ($CH_4$) and air to the action of an electric discharge.

2. The method of producing hydrocyanic acid (HCN), which consists in subjecting a mixture of a hydrocarbon gas and air to the action of an electric arc.

3. The method of producing hydrocyanic acid (HCN), which consists in subjecting a mixture of methan ($CH_4$), oxygen and nitrogen to the action of an electric arc.

Signed at New York, in the county of New York and State of New York, this 6th day of December, A. D. 1902.

ALEXANDER M. GOW.

Witnesses:
CHARLES A. TERRY,
WM. H. CAPEL.